(12) United States Patent
Katsura

(10) Patent No.: US 9,376,001 B2
(45) Date of Patent: Jun. 28, 2016

(54) SUNROOF DEVICE FOR A VEHICLE

(71) Applicant: AISIN SEIKI KABUSHIKI KAISHA, Kariya-shi, Aichi-ken (JP)

(72) Inventor: Shintaro Katsura, Novi, MI (US)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 14/751,821

(22) Filed: Jun. 26, 2015

(65) Prior Publication Data
US 2015/0375605 A1    Dec. 31, 2015

(30) Foreign Application Priority Data
Jun. 27, 2014    (JP) .................................. 2014-133198

(51) Int. Cl.
*B60J 7/043*    (2006.01)
*B60J 7/02*    (2006.01)
*B60J 7/057*    (2006.01)

(52) U.S. Cl.
CPC ................ *B60J 7/0435* (2013.01); *B60J 7/024* (2013.01); *B60J 7/0573* (2013.01)

(58) Field of Classification Search
CPC ........... B60J 7/24; B60J 7/0435; B60J 7/0573
USPC ....................... 296/223, 224, 216.02–216.05
See application file for complete search history.

(56) References Cited

U.S. PATENT DOCUMENTS

| | | | | |
|---|---|---|---|---|
| 5,899,524 A | * | 5/1999 | Mori | ........................... B60J 7/05 296/222 |
| 7,344,188 B2 | * | 3/2008 | Sawada | .................... B60J 7/024 296/216.03 |
| 2013/0264845 A1 | | 10/2013 | Katsura et al. | |

FOREIGN PATENT DOCUMENTS

JP    2013-184648    9/2013

* cited by examiner

*Primary Examiner* — Dennis H Pedder
(74) *Attorney, Agent, or Firm* — Finnegan, Henderson, Farabow, Garrett & Dunner, LLP

(57) ABSTRACT

A sunroof device for a vehicle, includes: a guide rail provided on each edge in a width direction of a vehicle of an opening formed on a vehicle roof; a first sliding member linked with each edge in the width direction of the vehicle of a movable panel opening and closing the opening; a guide block in which an engagement groove is formed and which is provided on the guide rail; a check including an engagement protrusion capable of engaging with the engagement groove; and a regulation wall preventing deformation of the guide block when the first sliding member moves toward the rear side of the vehicle with respect to the movable panel in the fully closed state.

7 Claims, 7 Drawing Sheets

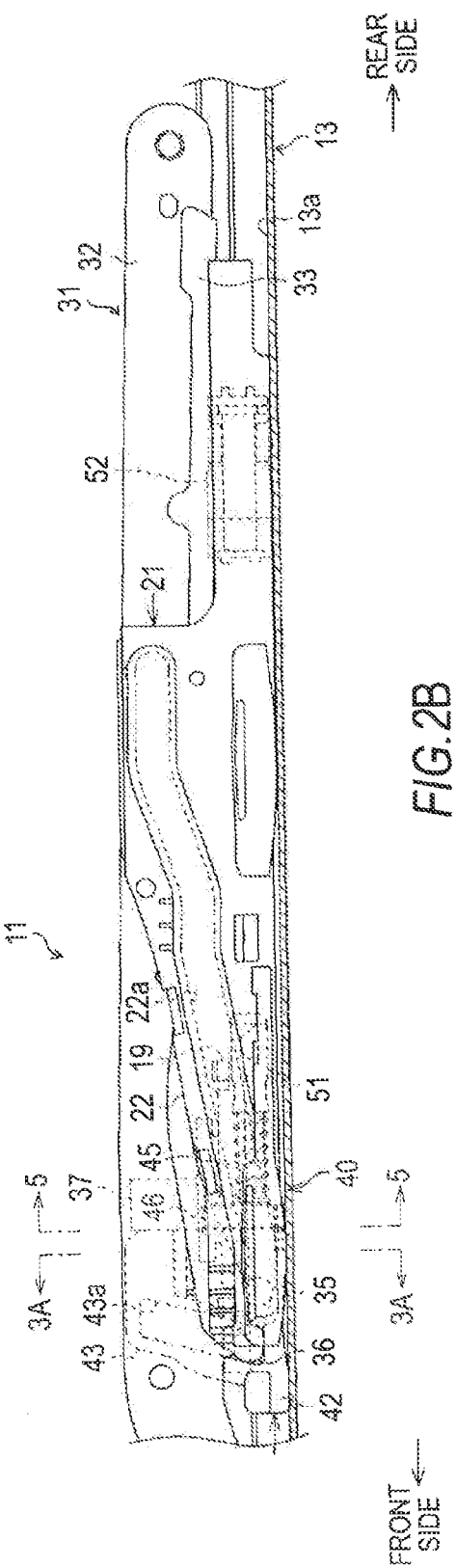
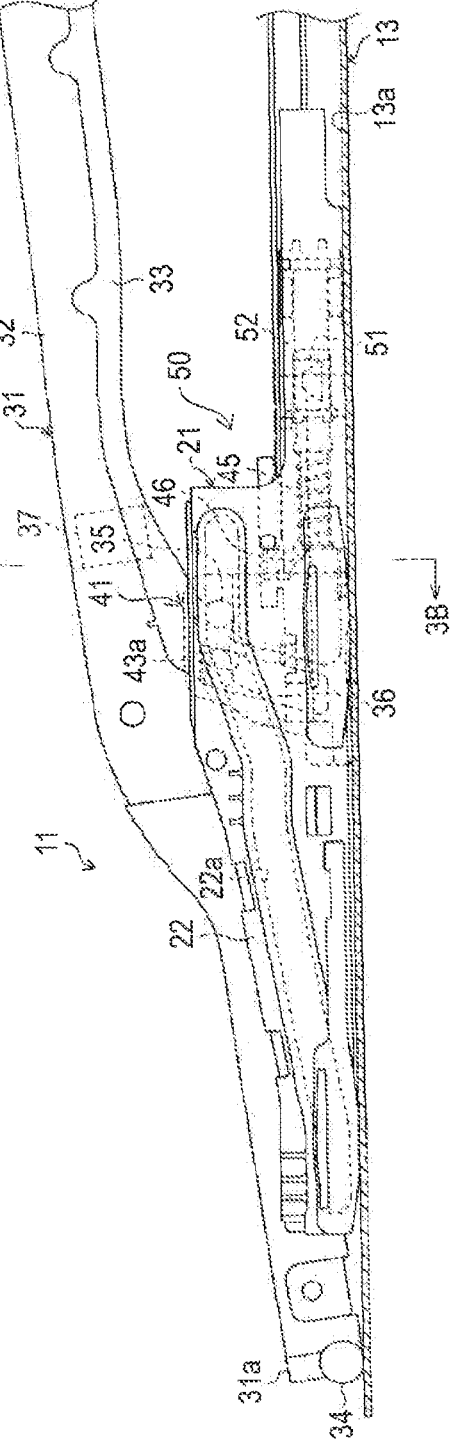
FIG.2A
FIG.2B

FIG.3A
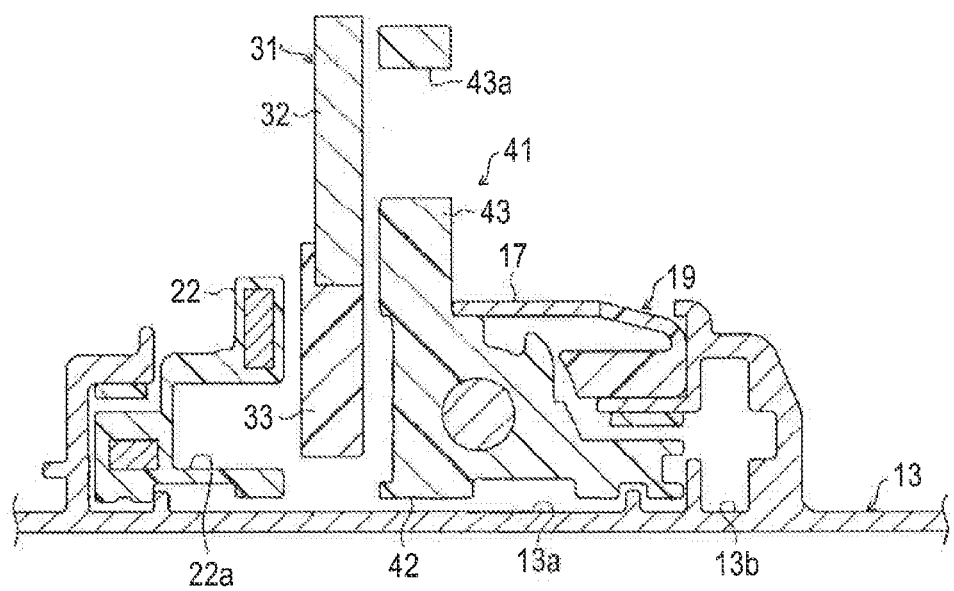
FIG.3B
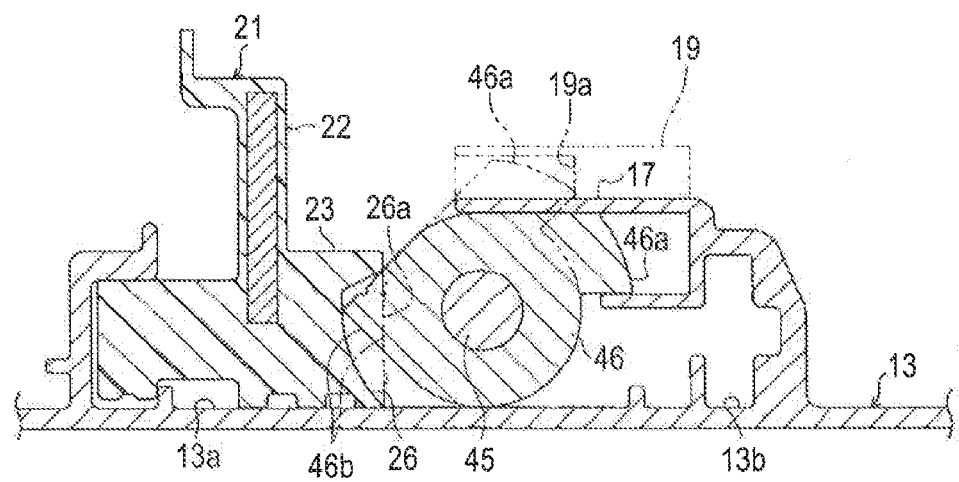

SUNROOF DEVICE FOR A VEHICLE

CROSS REFERENCE TO RELATED APPLICATIONS

This application is based on and claims priority under 35 U.S.C. §119 to Japanese Patent Application 2014-133198, filed on Jun. 27, 2014, the entire contents of which are incorporated herein by reference.

TECHNICAL FIELD

This disclosure relates to a sunroof device for a vehicle.

BACKGROUND DISCUSSION

In the related art, for example, as a sunroof device for a vehicle, a sunroof device (so-called an outer slide sunroof) which is disclosed in JP 2013-184648A (Reference 1) is known, The sunroof device for a vehicle includes a guide rail which is provided on each of both edges in a width direction of a vehicle of an opening formed on a vehicle roof, a sliding member which is linked with each of both edges in the width direction of a vehicle of a movable panel which is movably provided along each guide rail and opens and closes the opening, and an electric drive source which is driven to move both sliding members. In addition, the sunroof device for a vehicle includes a guide block (check block) in which an engagement groove is formed and which is provided on each guide rail, and a check (rotation check) which includes an engagement protrusion capable of engaging with the engagement groove and is connected to each edge in the width direction of a vehicle of the movable panel.

In a state where the movable panel is fully closed, the sliding member moves toward the front side of the vehicle with respect to the movable panel, the rear portion of the moveable panel is lifted with the front portion thereof as a support point, the movable panel is transferred to a tilt-up state, and in the tilt-up state, when the sliding member moves toward the rear side of the vehicle after the sliding member moves toward the front side of the vehicle with respect to the movable panel, the sliding member engages with the movable panel, and thus, the tilt-up state is maintained. Accordingly, in this state, when the sliding member moves toward the rear side of the vehicle, the moveable panel is opened in the tilt-up state.

In addition, in the fully closed state of the movable panel, the engagement protrusion of the check engages with the engagement groove, the movement of the movable panel is regulated when the sliding member moves toward the front side of the vehicle, and when the sliding member moves toward the rear side of the vehicle after the sliding member further moves toward the front side of the vehicle, the engagement protrusion is guided so as to be removed from the engagement groove, and the regulation of the movement of the movable panel is released.

However, in a controller which drives and controls an electric drive source, in order to realize the above-described operation of the movable panel, for example, it is possible to detect the position (hereinafter, also referred to as an "initial position") of the sliding member in the fully closed state and store (hereinafter, referred to as "initialize") the position. Specifically, in the fully closed state of the movable panel, since the engagement protrusion of the check engages with the engagement groove of the guide block and the movement of the movable panel is regulated, when the sliding member moves toward the rear side of the vehicle with respect to the movable panel, the electric drive source is overloaded according to the regulation of the movement of the sliding member. The controller performs detection or the like of the initial position of the sliding member based on the overload state of the electric drive source.

However, when the electric drive source is overloaded in the movement regulation state of the movable panel, for example, the guide block, the guide rail supporting the guide block, or the like is deformed, and a position of the sliding member, which is deviated from the original initial position of the sliding member to the rear side of the vehicle, is likely to be detected as the initial position. In addition, since the initial position of the sliding member is detected in the unstable state, there is a concern that accuracy of initialization may decrease.

SUMMARY

Thus, a need exists for a sunroof device for a vehicle which is not suspectable to the drawback mentioned above.

An aspect of this disclosure is directed to a sunroof device for a vehicle including a guide rail which is provided on each edge in a width direction of a vehicle of an opening formed on a vehicle roof; a first sliding member which is linked with each edge in the width direction of the vehicle of a movable panel opening and closing the opening, is driven so as to move along the guide rail by an electric drive source driven and controlled by a controller, is moved toward the front side of the vehicle with respect to the movable panel in a fully closed state of the movable panel, lifts the rear portion of the movable panel with the front portion thereof as a support point, and transfers the movable panel to a tilt-up state, in which in the tilt-up state, the first sliding member engages with the movable panel when the first sliding member moves toward the rear side of the vehicle after the first sliding member further moves toward the front side of the vehicle with respect to the movable panel to maintain the tilt-up state; a guide block in which an engagement groove is formed and which is provided on the guide rail; a check which includes an engagement protrusion capable of engaging with the engagement groove, is connected to each edge in the width direction of the vehicle of the movable panel, regulates the movement of the movable panel when the engagement protrusion engages with the engagement groove in the fully closed state and the first sliding member moves toward the front side of the vehicle, and releases the regulation of the movement of the movable panel so that the engagement protrusion is deviated from the engagement groove when the first sliding member moves toward the rear side of the vehicle after the first sliding member further moves toward the front side of the vehicle; and a regulation wall which prevents deformation of the guide block when the first sliding member moves toward the rear side of the vehicle with respect to the movable panel in the fully closed state.

BRIEF DESCRIPTION OF THE DRAWINGS

The foregoing and additional features and characteristics of this disclosure will become more apparent from the following detailed description considered with the reference to the accompanying drawings, wherein:

FIGS. 2A and 2B are side views showing a fully closed state and a second tilt-up state of a movable panel;

FIGS. 3A and 3B are cross-sectional views taken along lines 3A-3A and 3B-3B of FIG. 2, respectively;

DETAILED DESCRIPTION

Hereinafter, an embodiment of a sunroof device for a vehicle will be described. In addition, hereinafter, a front-rear direction of a vehicle is referred to as a "front-rear direction", and an upper side and a lower side in a height direction of the vehicle are referred to as an "upper side" and a "lower side", respectively. In addition, an inner side which is directed to the inner side of a cabin in a width direction of the vehicle is referred to as an "inside of a vehicle", and an outer side which is directed to the outer side of the cabin in the width direction of the vehicle is referred to as an "outside of a vehicle".

Figure 8:
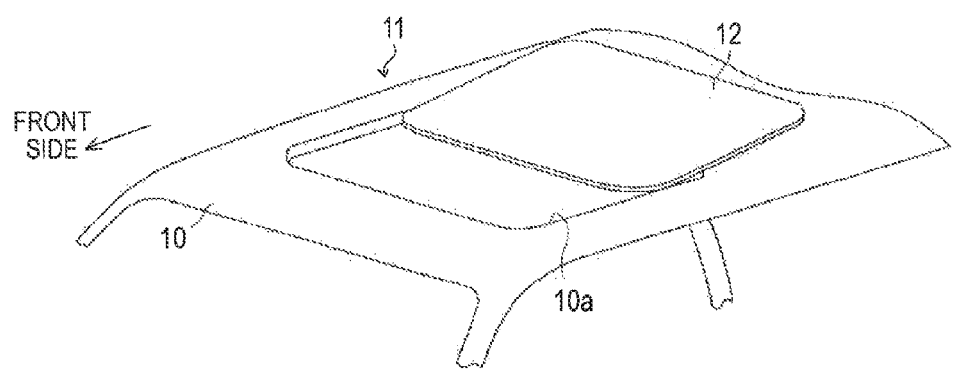
FIG. 8 is a perspective view when a roof is viewed from the obliquely upper portion.

As shown in FIG. 8, approximately a rectangular opening 10a is formed on a vehicle roof 10 of an automobile or the like, and a sunroof device 11 is mounted on the vehicle roof 10. The sunroof device 11 moves in the front-rear direction, opens and closes the opening 10a, and, includes approximately a rectangular movable panel 12 formed of a glass plate, for example.

The movable panel 12 is attached so as to perform a tilt-up operation in which the rear portion of the movable panel 12 is lifted with the front portion thereof as a support point, and a slide operation in the front-rear direction. As opening and closing operations of the opening 10a performed by the movable panel 12, a so-called outer sliding type, in which the slide operation is performed in a state where a tilt-up is maintained, is adopted.

Next, a structure of the sunroof device 11 related to opening and closing operations of the movable panel 12 will be described.

Figure 9:
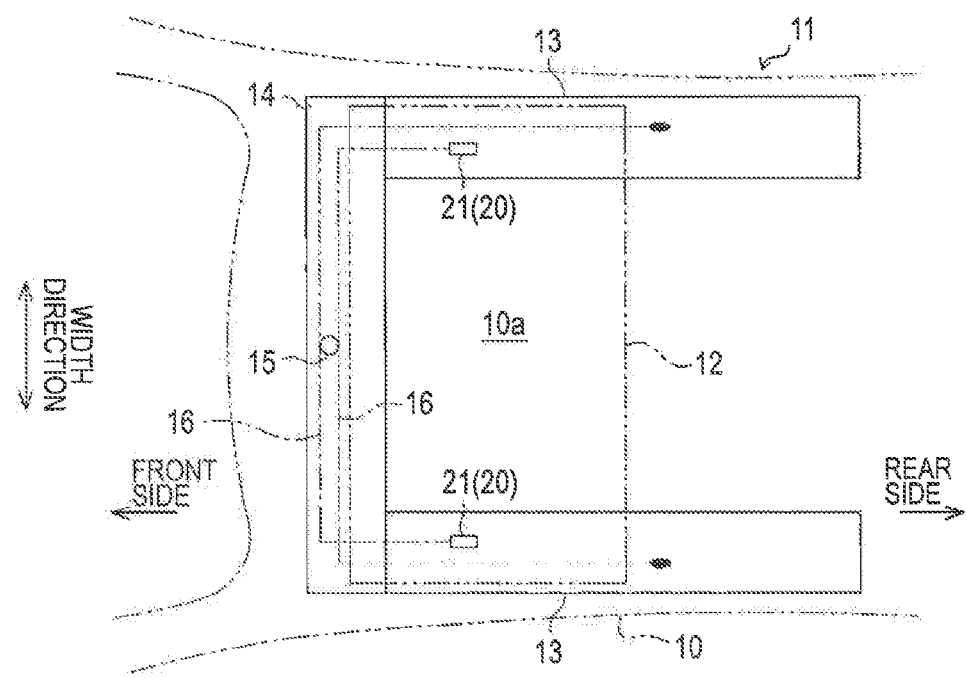
FIG. 9 is a plan view showing the embodiment.

As shown in FIG. 9, a pair of guide rails 13 is disposed on both edges in the width direction of the vehicle of the opening 10a. For example, each guide rail 13 is configured of an extruded material formed of aluminum alloy, has a constant cross-section in a longitudinal direction, and extends in the front-rear direction. In addition, a functional component 20 is guided and supported by each guide rail 13 so as to be movable in the front-rear direction. The movable panel 12 is linked with and supported by both functional components 20 in a state where the movable panel 12 is bridged between both functional components 20. Both functional component 20 move in the front-rear direction along the guide rails 13, and thus, the movable panel 12 performs the tilt-up operation or the slide operation.

The front ends of both guide rails 13 are connected to each other via a front housing 14 which extends in the width direction of the vehicle. For example, a motor 15 which includes an output gear and serves as an electric drive source is installed at an intermediate portion in a longitudinal direction of the front housing 14. For example, the motor 15 is connected to each functional component 20 via each of a pair of drive belts 16 which is formed of a resin material and has approximately a band shape, and simultaneously moves both function components 20 in the front-rear direction.

As shown in FIGS. 3A and 33, in each guide rail 13, a first rail portion 13a which opens upward and has approximately a C-shaped cross-section is formed, and a second rail portion 13b is formed so as to be adjacent to the outside of the vehicle of the first rail portion 13a. In addition, the second rail portion 13b has approximately a T-shaped cross-section in cooperation with a side wall of the first rail portion 13a, and communicates with the first rail portion 13a via an opening which is formed on the side wall. In addition, in each guide rail 13, a flange-shaped guide portion 17 is formed on the upper side of the outside portion of the vehicle of the first rail portion 13a.

Figure 4:
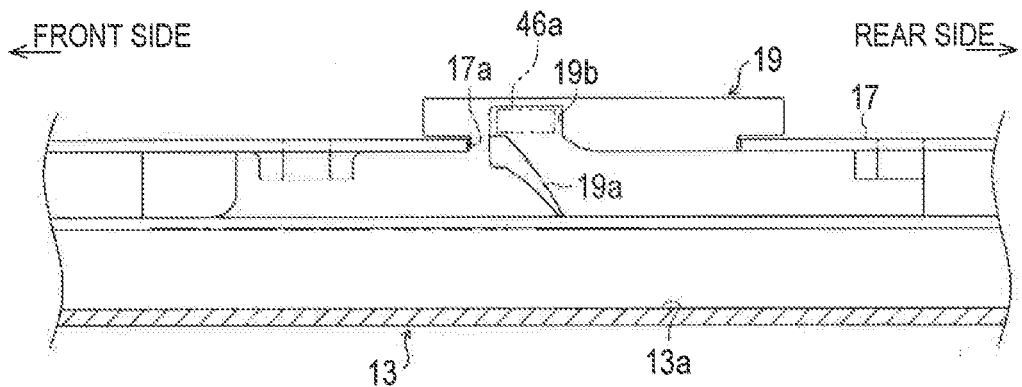
FIG. 4 is a side view showing a guide block and a peripheral structure thereof.

As shown in FIG. 4, in the guide portion 17, approximately a rectangular notch 17a is formed at a predetermined position close to the front side of the vehicle. In addition, a guide block 19, which is disposed on the outside portion of the vehicle of the first rail portion 13a and is fitted to the guide portion 17 in the notch 17a, is fixed to the guide rail 13. In the guide block 19, an engagement groove 19a which passes from the upper side of the guide portion 17 to the lower side thereof is formed. That is, the engagement groove 19a is inclined downward toward the rear side of the vehicle, and the lower end of the engagement groove 19a passes through the lower side of the guide portion 17.

Figure 1:
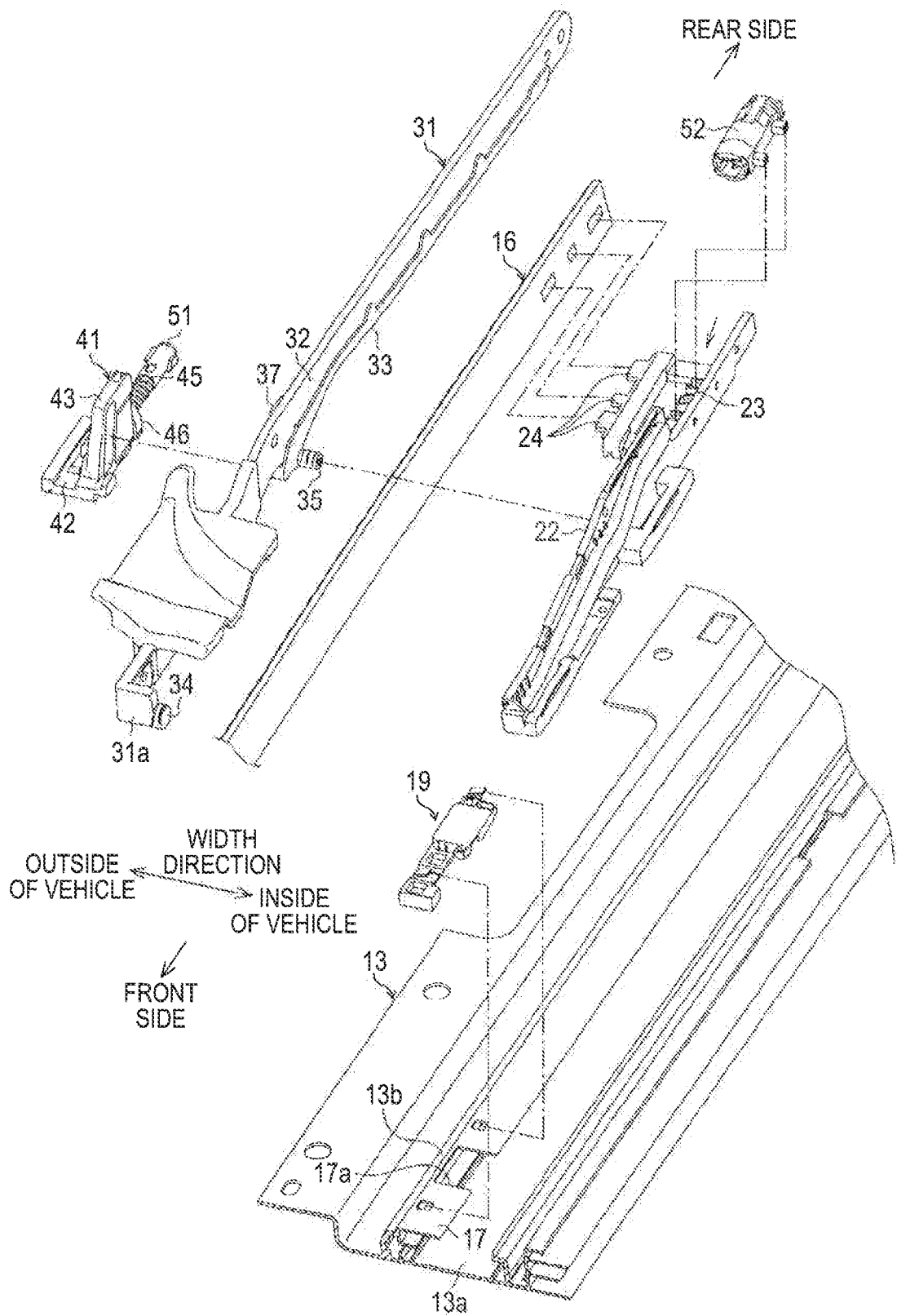
FIG. 1 is an exploded perspective view showing an embodiment disclosed here.

As shown in FIG. 1, for example, a drive shoe 21 serving as a first sliding member in which a metal plate and a resin are integrated is mounted on the guide rail 13 (first rail portion 13a) so as to be movable in the front-rear direction. In the drive shoe 21, a vertical wall portion 22 is erected over approximately the entire length of the drive shoe 21 in the front-rear direction, and a protruding wall portion 23 protrudes to the outside of the vehicle by a constant distance over approximately the entire length in the front-rear direction from the lower end portion of the vertical wall portion 22. Moreover, the drive shoe 21 includes a plurality (three) of extension pieces 24 which enter the second rail portion 13b which is the outside of the vehicle. The extension pieces 24 are connected to the drive belt 16 which causes the second rail portion 13b to slide in the front-rear direction. The drive belt 16 is moved in the front-rear direction along the guide rail 13 (second rail portion 13b) by a motor 15, and accordingly, the drive shoe 21 moves in the front-rear direction along the first rail portion 13a.

As shown in FIGS. 2A and 2B, in the vertical wall portion 22, a guide groove 22a, which is recessed from the end surface on the outside of the vehicle of the vertical wall portion 22 to the inside of the vehicle, is formed so as to extend in the front-rear direction. The guide groove 22a is substantially inclined upward toward the rear side. In addition, as shown in FIG. 3B, an engagement concave portion 26 which is recessed from the end surface on the outside of the vehicle toward the inside of the vehicle is formed at the intermediate portion in the longitudinal direction of the protruding wall portion 23. A regulation portion 26a is formed on the rear end surface of the engagement concave portion 26.

Meanwhile, as shown in FIG. 1, a support bracket 31 which is a support member extending in the front-rear direction at each edge in the width direction of the vehicle is fixed to the lower surface of the movable panel 12. The support bracket 31 extends over approximately the entire length of the movable panel 12, and includes a vertical wall portion 32 which is configured of a metal plate provided vertically to the lower surface of the movable panel 12 and a resin molded portion 33 in which the lower edge of the vertical wall portion 32 is mainly embedded.

The support bracket 31 is substantially provided in parallel to the outside of the vehicle of the vertical wall portion 22 so as to be disposed above the protruding wall portion 23 of the drive shoe 21. An attachment piece 31a which is bent toward the inside of the vehicle is formed on the front end of the support bracket 31, and approximately a columnar driven shoe 34 is formed on the tip of the attachment piece 31a. The driven shoe 34 is mounted so as to be movable in the front-rear direction with respect to the first rail portion 13a of the guide rail 13 on the front side of the vehicle of the drive shoe 21. For example, the support bracket 31 is rotated on that the rear portion of the support bracket 31 is lifted with the front portion (driven shoe 34) thereof as a support point, the movable panel 12 performs atilt-up operation, and the support bracket 31 is rotated so that the rear portion is lowered with the front portion as the support point, and the movable panel 12 performs a tilt-down operation. The drive shoe 21 and the driven shoe 34 configure the functional component 20.

As shown in FIG. 2A, approximately a columnar lifting guide pin 35 which protrudes to the inside of the vehicle and is movably fitted into the guide groove 22a is integrally provided on the front end portion of the molded portion 33. The lifting guide pin 35 is set so as to be disposed on the lower end of the guide groove 22a in a fully closed state of the movable panel 12. Accordingly, in this state, when the drive shoe 21 moves toward the front side of the vehicle with respect to the support bracket 31 by a predetermined distance, the lifting guide pin 35 goes up the guide groove 22a and reaches the intermediate portion of the guide groove 22a. In this case, the support bracket 31 is rotated so that the rear portion of the support bracket 31 is lifted with the front portion with the support point, and thus, the movable panel 12 performs the tilt-up operation (first tilt-up state).

Subsequently, when the drive shoe 21 further moves toward the front side of the vehicle along the guide rail 13 (first rail portion 13a), as shown in FIG. 2B, the lifting guide pin 35 further goes up the guide groove 22a and reaches the terminal of the guide groove 22a. In this case, the support bracket 31 is rotated so that the rear portion is further lifted with the front portion as the support point, and thus, the movable panel 12 further performs the tilt-up operation (second tilt-up state).

Moreover, approximately a columnar lock pin 36 which protrudes to the outside of the vehicle is integrally provided on the front end portion which is positioned farther forward in the vehicle than the lifting guide pin 35 of the molded portion 33. In addition, a regulation wall 37 which protrudes to the outside of the vehicle is integrally provided on the front end portion which is positioned further rearward in the vehicle than the lifting guide pin 35 of the molded portion 33.

Figure 5:
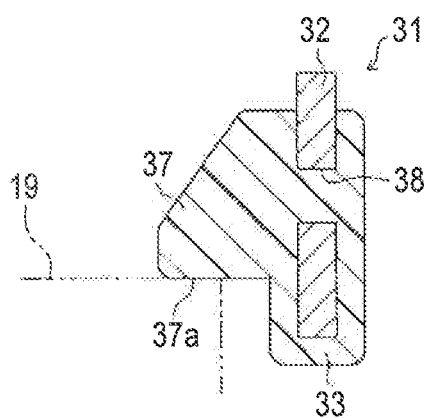
FIG. 5 is a cross-sectional view taken along line 5-5 of FIG. 2.

That is, as shown in FIG. 5, a through hole 38 penetrating the vertical wall portion 32 in the width direction of the vehicle is formed on the vertical wall portion 32 so as to be matched with at least the position of the regulation wall 37. The molded portion 33 buries the vertical wall portion 32 to fill the through hole 38. This is performed to integrate the regulation wall 37 and the vertical wall portion 32 to further strengthen the regulation wall 37. In addition, the regulation wall 37 is formed in approximately a rectangular trapezoid (strictly, a square trapezoid in which the upper portion is expanded) shaped column. In the rectangular trapezoid, the lower side adjacent to the lower side right angle is set so as to be longer than the upper side adjacent to the upper side right angle, and the lower surface of the regulation wall 37 configuring the lower sides forms a regulation surface 37a which approximately horizontally protrudes in the width direction of the vehicle.

As shown in FIG. 1, in the guide rail 13 (first rail portion 13a), for example, a slide check 41 which is a second sliding member formed of a resin material is movably mounted in the front-rear direction so as to be adjacent to the outside of the vehicle of the support bracket 31. That is. as shown in FIG. 3A, the slide check 41 includes a shoe portion 42 which slides on the outer portion of the vehicle of the first rail portion 13a, and a vertical wall portion 43 which is erected upward between the support bracket 31 and the guide portion 17 in the width direction of the vehicle. In a state where the slide check 41 is positioned by the support bracket 31 and the guide portion 17, which abut or approach the vertical wall portion 43, in the width direction of the vehicle, the slide check 41 causes the shoe portion 42 to slide on the outer portion of the vehicle of the first rail portion 13a. and thus, the shoe portion 42 can move in the front-rear direction along the guide rail 13.

As shown in FIGS. 2A and 2B, a slot-shaped allowance hole 43a, to which the locking pin 36 is movably fitted, is formed on the front end portion of the vertical wall portion 43. The allowance hole 43a is linearly inclined upward toward the rear side of the vehicle. That is, the slide check 41 is connected to the support bracket 31 via the locking pin 36 which is fitted into the allowance hole 43a. The slide check 41 idles the locking pin 36 in the allowance hole 43a, and thus, the tilt operation (tilt-up operation or tilt-down operation) of the movable panel 12 is allowed. In addition, when the tilt operation of the movable panel 12 is regulated, the slide check 41 regulates the movement in the front-rear direction of the locking pin 36 (support bracket 31) in the allowance hole 43a. Accordingly, the slide check 41 moves in the front-rear direction, and thus, the movable panel 12 supported by the support bracket 31 integrally moves (slides) in the front-rear direction.

In the slide check 41, approximately a columnar support shaft 45, in which the center axis of the support shaft 45 extends in the front-rear direction, nonrotatably protrudes toward the rear side of the vehicle. In addition, approximately an annular rotation check 46 adjacent to the slide check 41 is swiveled at the front end portion of the support shaft 45. As shown in FIG. 3B, the rotation check 46 includes approximately a saw-tooth shaped engagement protrusion 46a which protrudes to the outside in a radial direction at a predetermined angular position (a right facing angular position in the drawing) about the support shaft 45, and approximately a triangular tooth shaped pressed portion 46b which protrudes to the outside in a radial direction at a predetermined angular position (a left facing angular position in the drawing) about the support shaft 45. Moreover, as shown by two-dot chain lines in FIG. 3B, in the rotation check 46, for example, in the fully closed state of the movable panel 12, the engagement protrusion 46a engages with the engagement groove 19a of the guide block 19 above the guide portion 17, and the pressed portion 46b abuts or approaches the lower surface of the first rail portion 13a and the outer surface of the vehicle of the protruding wall portion 23. Accordingly, in the fully closed state of the movable panel 12, the rotation of the rotation check 46 is regulated by the lower surface of the first rail portion 13a or the like in the state where the engagement protrusion 46a engages with the engagement groove 19a of the guide block 19. Therefore, the movement in the front-rear direction of the rotation check 46 is regulated, and thus, the movement in the front-rear direction of the slide check 41 is regulated along with the rotation check 46. In addition, since the movement in the front-rear direction of the support bracket 31 connected to the slide check 41 via the allowance hole 43a is also regulated, only transfer of the movable panel 12 from the fully closed state to the tilt-up state is allowed.

The guide block 19, the slide check 41, the rotation check 46, or the like configures a check mechanism 40.

As described above, the engagement concave portion 26 is formed on the protruding wall portion 23 of the drive shoe 21. In addition, when the engagement concave portion 26 reaches the pressed portion 46b according to the movement of the drive shoe 21 toward the front side of the vehicle, the rotation of the rotation check 46 is allowed in the engagement concave portion 26. Accordingly, in this state, when the rotation check 46 moves toward the rear side of the vehicle along with the drive shoe 21, the engagement protrusion 46a is guided to the engagement groove 19a, and thus, as shown by a solid-line in FIG. 3B, the rotation check 46 is rotated in a clockwise direction. In addition, the engagement protrusion 46a enters to the lower side of the guide portion 17 so as to be interposed between the first rail portion 13a and the guide portion 17. Accordingly, the rotation of the rotation check 46 is regulated. Simultaneously, the pressed portion 46b engages with the engagement concave portion 26. In this case, the pressed portion 46b is positioned at the movement trajectory in the front-rear direction of the regulation portion 26a of the drive shoe 21.

As shown in FIG. 2A, for example, a rotation cam 51 which is a second engagement member formed of a resin material is swiveled at the rear end portion of the support shaft 45. Meanwhile, for example, in the drive shoe 21, a fixing cam 52 which is a first engagement member formed of a resin material is disposed so as to be coaxial with the rotation cam 51 at the rear side of the vehicle of the rotation cam 51. The fixing cam 52 is separated from the rotation cam 51 at the position of the drive shoe 21 corresponding to when the movable panel 12 is at least transferred from the fully closed state to the first tilt-up state. In addition, as shown in FIG. 2B, the position of the fixing cam 52 overlaps with the position of the rotation cam 51 in the front-rear direction at the position of the drive shoe 21 corresponding to when the movable panel 12 is transferred to the second tilt-up state. The rotation cam 51 and the fixing cam 52 configure a well-known engagement and disengagement switch mechanism 50. The engagement and disengagement switch mechanism 50 switches a release state of engagement between the rotation cam 51 and the fixing cam 52 to an engagement state by a pressing operation between the rotation cam 51 and the fixing cam 52, or switches the engagement state between the rotation cam 51 and the fixing cam 52 to the release state of the engagement.

According to this configuration, for example, in the fully closed state of the movable panel 12, when the drive shoe 21 moves toward the front side of the vehicle with respect to the support bracket 31 by the predetermined distance, the locking pin 36 idles in the allowance hole 43a so as to be lifted along the allowance hole 43a of the slide check 41, and the lifting guide pin 35 goes up the guide groove 22a and reaches at the intermediate portion of the guide groove 22a. Accordingly, the movable panel 12 is transferred to the first tilt-up state.

As described above, in the position of the drive shoe 21 corresponding to when the movable panel 12 is at least transferred from the fully closed state to the first tilt-up state, the rotation cam 51 and the fixing cam 52 of the engagement and disengagement switch mechanism 50 are separated from each other in the front-rear direction (release state of the engagement between the rotation cam 51 and the fixing cam 52). Accordingly, in the first tilt-up state of the movable panel 12, when the drive shoe 21 moves toward the rear side of the vehicle, the locking pin 36 idles in the allowance hole 43a so as to be lowered along the allowance hole 43a of the slide check 41, and the lifting guide pin 35 goes down the guide groove 22a and reaches the terminal of the guide groove 22a. Accordingly, the movable panel 12 performs the tilt-down operation in which the rear portion of the support bracket 31 is lowered with the front portion thereof as the support point, and thus, is transferred to the fully closed state.

Meanwhile, when the drive shoe 21 further moves toward the front side with respect to the support bracket 31 in the first tilt-up state of the movable panel 12, the locking pin 36 idles in the allowance hole 43a so as to be further lifted along the allowance hole 43a of the slide check 41, and the lifting guide pin 35 goes up the guide groove 22a and reaches the terminal of the guide groove 22a. Accordingly, the movable panel 12 is transferred to the second tilt-up state. In addition, the engagement concave portion 26 reaches the pressed portion 46b according to the movement of the drive shoe 21 toward the front side of the vehicle, and thus, the rotation of the rotation check 46 is allowed.

In this case, as described above, the positions of the rotation cam 51 and the fixing cam 52 of the engagement and disengagement switch mechanism 50 overlap with each other in the front-rear direction. Accordingly, thereafter, when the drive shoe 21 moves toward the rear side of the vehicle along with the fixing cam 52, the slide check 41 and the rotation check 46 integrally move toward the rear side of the vehicle along with the rotation cam 51 according to the switching to the engagement state due to the pressing operation between the rotation cam 51 and the fixing cam 52. Accordingly, the rotation check 46, in which the rotation is allowed in the engagement concave portion 26, is rotated so that the engagement protrusion 46a is guided to the engagement groove 19a and thus, the engagement protrusion 46a enters the lower side of the guide portion 17. In addition, in this state, the rotation of the rotation check 46 is regulated. Accordingly, the regulation of the movement of the slide check 41 toward the rear side of the vehicle is released, and the regulation of the movement toward the rear side of the vehicle of the support bracket 31, which is connected to the slide check 41 via the allowance hole 43a or the like, is also released. Similarly, the pressed portion 46b enters the engagement concave portion 26 and is disposed at the movement trajectory in the front-rear direction of the regulation portion 26a.

Accordingly, when the drive shoe 21 moves toward the rear side of the vehicle, the slide check 41 integrally moves toward the rear side of the vehicle along with the support bracket 31 and the rotation check 46 via the rotation cam 51 and the fixing cam 52 engaging with each other. In this case, the movable panel 12 supported by the support bracket 31 moves toward the rear side of the vehicle in the second tilt-up state, and thus, opens the opening 10a. Accordingly, the movable panel 12 reaches an open state.

In the open state of the movable panel 12, as described above, the rotation of the rotation check 46 is regulated in the state where the engagement protrusion 46a enters the lower side of the guide portion 17. In addition, the pressed portion 46b is disposed at the movement trajectory in the front-rear direction of the regulation portion 26a, Accordingly, in this state, when the drive shoe 21 moves toward the front side of the vehicle, the regulation portion 26a presses the pressed portion 46b, and thus, the rotation check 46 integrally moves toward the front side of the vehicle along with the slide check 41 and the support bracket 31. In this case, the movable panel 12 supported by the support bracket 31 moves toward the front side of the vehicle in the second tilt-up state and closes the opening 10a.

According to the closing operation of the movable panel 12, when the movable panel 12 is transferred to the second tilt-up state and is closed to the original state, the engagement protrusion 46a is guided to the engagement groove 19a, and the rotation check 46 rotates so that the engagement protrusion 46a enters the upper side of the guide portion 17 while the pressed portion 46b is removed from the engagement concave portion 26. Accordingly, the movement in the front-rear direction of the rotation check 46 is regulated along with the slide check 41 and the support bracket 31.

In this state, when the drive shoe 21 further moves toward the front side of the vehicle, the fixing cam 52 further moves toward the front side of the vehicle with respect to the rotation cam 51 in which the movement in the front-rear direction is regulated along with the slide check 41. Accordingly, thereafter, when the drive shoe 21 moves toward the rear side of the vehicle, according to the switching to the release state of the engagement between the rotation cam 51 and the fixing cam 52 due to the pressing operation therebetween, the drive shoe 21 moves toward the rear side of the vehicle along with the fixing cam 52 in the state where the rotation check 46, the slide check 41, and the rotation cam 51 remain.

In this case, the locking pin 36 idles in the allowance hole 43a so that the locking pin 36 is lowered along the allowance hole 43a of the slide check 41, and the lifting guide pin 35 goes down the guide groove 22a and reaches the terminal of the guide groove 22a. According to this, the movable panel 12 performs the tilt-down operation, and is transferred to the fully closed state via the first tilt-up state.

Next, an electric configuration of the sunroof device 11 related to the opening and closing operations or the like of the movable panel 12 will be described.

Figure 6:
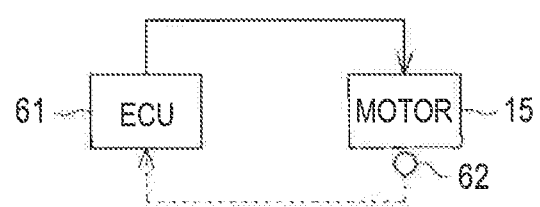
FIG. 6 is a block diagram schematically showing an electrical configuration of the embodiment.

As shown in FIG. 6, the sunroof device 11 includes an Electronic Control Unit (ECU) 61 which is a controller driving and controlling the motor 15, and a sensor 62 which detects a load of the motor 15 electrically connected to the ECU 61. The ECU 61 supplies electricity to the motor 15, performs a desired operation (forward rotation, rearward rotation, or the like), and controls a power supply based on the detection results of the sensor 62. Particularly, for example, the ECU 61 detects the position (initial position) of the drive shoe 21 in the fully closed state of the movable panel 12 when the sunroof device 11 is mounted on the vehicle in a production factory, and stores (initializes) the position. This is performed because the above-described operations of the movable panel 12 are realized according to the movement of the drive shoe 21.

Specifically, in the fully closed state of the movable panel 12, the ECU 61 drives the motor 15 so that the drive shoe 21 moves toward the rear side of the vehicle. In this case, the support bracket 31, in which the lifting guide pin 35 is pressed to the terminal (lower end) of the guide groove 22e. integrally moves toward the rear side of the vehicle, and the slide check 41 which is pressed to the rear end of the allowance hole 43a integrally moves toward the rear side of the vehicle along with the locking pin 36. However, since the engagement protrusion 46a of the rotation check 46 provided in the slide check 41 engages with the engagement groove 19a of the guide block 19, the engagement protrusion 46a abuts the rear end surface 19b (refer to FIG. 4) of the engagement groove 19a which is positioned above the guide portion 17, and thus, the movement of the slide check 41 toward the rear side of the vehicle is regulated. Accordingly, the movement of the drive shoe 21 toward the rear side of the vehicle via the support bracket 31 is also regulated, and thus, the motor 15 which moves the drive shoe 21 toward the rear side of the vehicle is overloaded. The ECU 61 detects the overload state by the sensor 62, and thus, is initialized. In addition, the sensor 62 may detect the load (overload state) of the motor 15 through current (motor current) which is supplied to the motor 15, or may detect the load through a rotation speed of the motor 15, a change in the rotation speed, or an angular acceleration.

Next, an operation of the present embodiment will be described.

Figure 7:
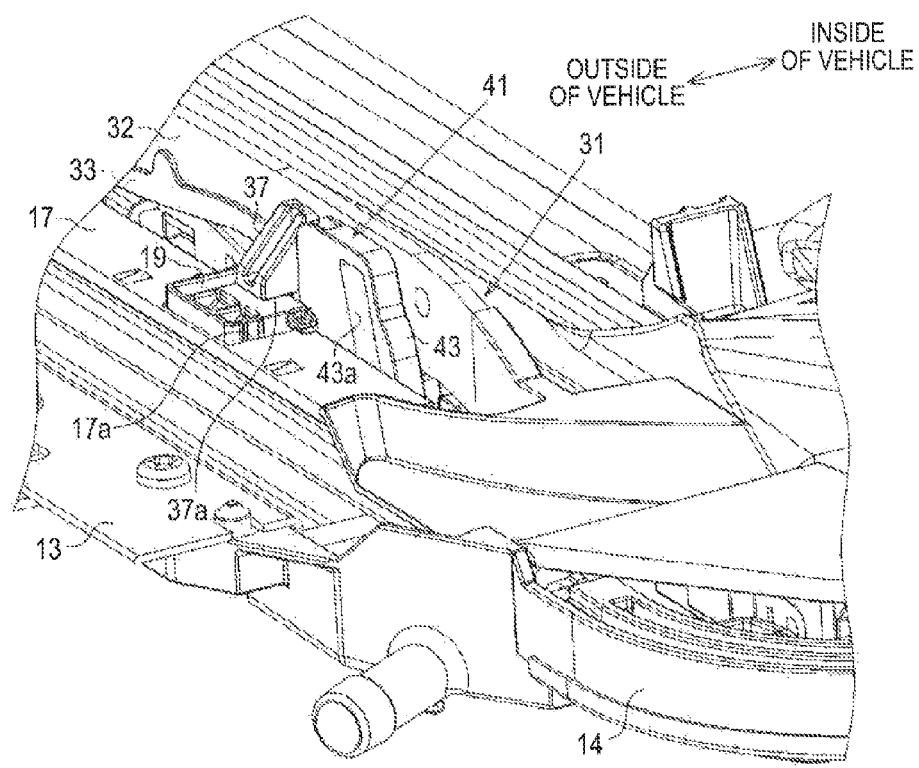
FIG. 7 is a perspective view showing the fully closed state of the movable panel in the embodiment.

As shown in FIG. 7, the regulation wall 37 provided in the support bracket 31 abuts or approaches the guide block 19 when the movable panel 12 is in the fully closed state. That is, the regulation wall 37 abuts or approaches the upper surface (an upper end surface in the height direction of the vehicle) of the guide block 19 penetrating the notch 17a in the regulation surface 37a. Accordingly, when the initialization is performed, for example, the guide block 19, in which the rear end surface 19b of the engagement groove 19a is pressed to the engagement protrusion 46a, is prevented from being deformed to lift the portion positioned at the opening end (the inner end of the vehicle) side of the notch 17a, or the guide portion 17 itself is prevented from being deformed to lift the tip (the inner end of the vehicle) of the guide portion 17. Accordingly, for example, it is possible to decrease possibility of detecting the position deviated toward the rear side of the vehicle from the original initial position of the drive shoe 21 as the initial position, or the like.

As described above, according to the present embodiment, effects described below can be obtained.

(1) In the present embodiment, it is possible to decrease possibility of detecting the initial position of the drive shoe 21 in an unstable state or the like, and it is possible to further improve accuracy when the initialization is performed.

(2) In the present embodiment, since the regulation wall 37 is integrally provided in the support bracket 31, it is possible to decrease an increase in the number of parts.

(3) In the present embodiment, since the regulation wall 37 abuts or approaches the upper surface of the guide block 19 penetrating the notch 17a formed on the guide rail 13 (guide portion 17) in the height direction of the vehicle, the deformation of the guide block 19 is prevented. In this way, preferably, the regulation wall 37 is positioned above the guide block 19, and it is possible to decrease possibility of interfering with a peripheral component.

(4) In the present embodiment, since the regulation wall 37 is formed of a resin, it is possible to improve formability. Meanwhile, since the regulation wall 37 (molded portion 33) buries the vertical wall portion 32 to fill the through hole 38, it is possible to more tightly integrate the vertical wall portion 32.

(5) In the present embodiment, since the regulation wall 37 abuts or approaches the guide block 19 when the movable panel 12 is in the fully closed state, for example, it is possible to prevent the deformation of the guide block 19 while the vehicle travels, and it is possible to prevent rattling of the movable panel 12 in which the movement is regulated by the check mechanism 40.

(6) In the present embodiment, the regulation of the movement of the movable panel 12 and the release of the regulation performed by the check mechanism 40 are switched to each other by the engagement and the disengagement between the engagement protrusion 46a and the engagement groove 19a according to the rotation of the rotation check 46 around the support shaft 45. Meanwhile, the engagement between the fixing cam 52 and the rotation cam 51 is realized by the further movement of the drive shoe 21 toward the front side of the vehicle in the first tilt-up state, that is, the movement along the center line of the support shaft 45. Accordingly, the regulation of the movement of the movable panel 12 and the release of the regulation performed by the check mechanism 40, and the engagement between the fixing cam 52 and the rotation cam 51 can be realized so as to be matched to the movement in the front-rear direction along the movement direction of the drive shoe 21. In this way, since the rotation cam 51 and the rotation check 46 are collectively disposed around the support shaft 45, it is possible to cause the entire device to be more compact.

In addition, the above embodiment may be modified as follows.

Figure 10:
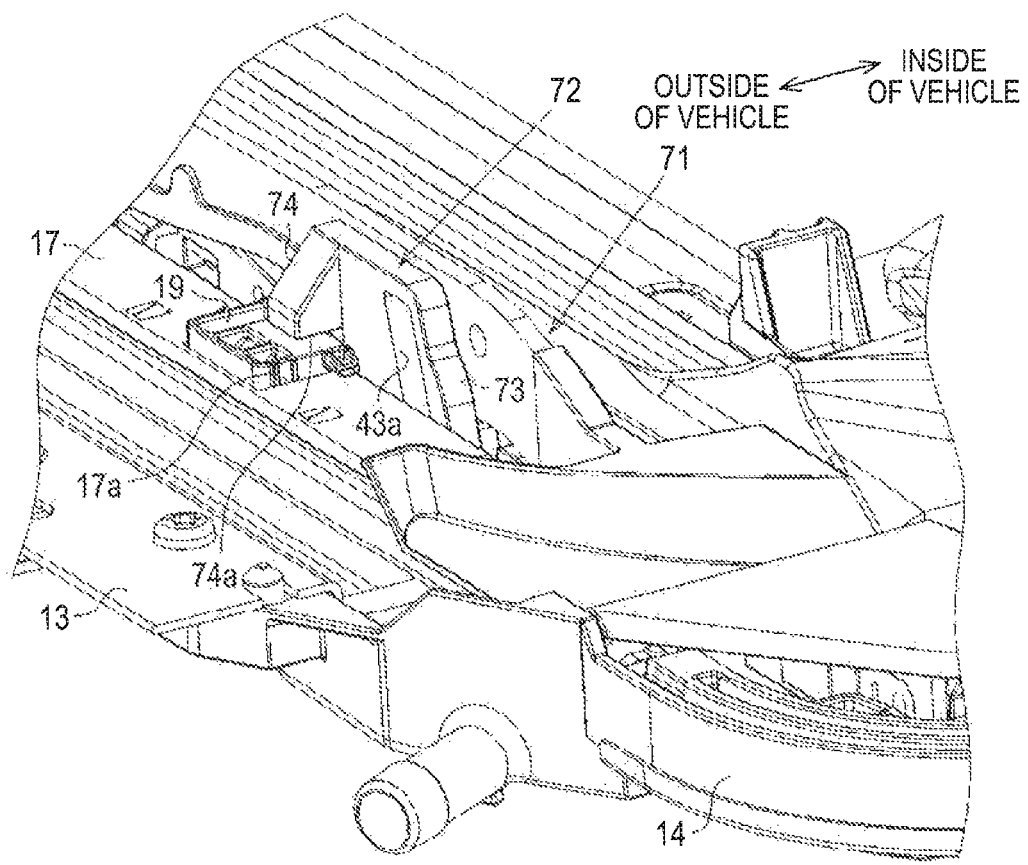
FIG. 10 is a perspective view showing the fully closed state of the movable panel in a modification example disclosed here.

As shown in FIG. 10, a support bracket 71 having the structure corresponding to that of the support bracket 31 except that the regulation wall is omitted may be adopted, and a slide check 72 having the structure corresponding to that of the slide check 41 except that the regulation wall is provided may be adopted. That is, in the slide check 72, the rotation cam 51 or the like (not shown) similar to that of the embodiment is provided. In addition, in the rear end of a vertical wall portion 73 corresponding to the vertical wall portion 43 of the slide check 72, a columnar regulation wall 74, which protrudes toward the outside of the vehicle and has approximately a rectangular trapezoid (strictly, a square trapezoid in which the upper portion is expanded), is integrally provided. In addition, in the rectangular trapezoid, the lower side adjacent to the lower side right angle is set so as to be longer than the upper side adjacent to the upper side right angle, and the lower surface of the regulation wall 74 configuring the lower sides forms a regulation surface 74a which approximately horizontally protrudes in the width direction of the vehicle.

When the movable panel 12 is in the fully closed state, the regulation wall 74 abuts or approaches the upper surface (an upper end surface in the height direction of the vehicle) of the guide block 19 penetrating the notch 17a in the regulation surface 74a. Therefore, according to the deformation, the following effects can be obtained in addition to the effects similar to (1), (3), (5), and (6) of the embodiment.

(1) Since the regulation wall 74 is integrally provided in the slide check 72, it is possible to decrease an increase in the number of parts.

(2) Since the regulation wall 74 is formed of a resin, it is possible to improve formability.

(3) Since the regulation wall 74 is provided in the slide check 72, for example, even when the movable panel 12 is transferred to the tilt-up state, the regulation wall 74 is not lifted according to the transfer. Accordingly, for example, it is possible to decrease possibility of exposure of the regulation wall 74 from the side portion of the vehicle, and it is possible to increase a design characteristic.

In the embodiment, as long as the lower surface of the regulation wall forms the regulation surface which approximately horizontally protrudes in the width direction of the vehicle, the shape of the regulation wall may have any shape. However, considering a decrease in the size of the regulation wall, preferably, the upper end portion of the regulation wall is decreased with respect to the lower end portion thereof.

In the embodiment, the regulation wall 37 (molded portion 33) may not bury the vertical wall portion 32 to fill the through hole 38. In this case, the through hole 38 may be omitted.

In the embodiment, for example, a separate regulation wall which is connected to the vertical wall portion 32 may be adopted. In this case, the regulation wall may be formed of a resin or metal.

In the embodiment, as long as it is possible to prevent the deformation of the guide block 19, a regulation wall may be adopted, which abuts or approaches a surface (for example, the inside surface of the vehicle) other than the upper surface of the guide block 19 when the movable panel 12 is in the fully closed state.

In the embodiment, for example, the guide block 19 may be integrally provided in the guide rail 13 (guide portion 17) using outsert molding or the like.

In the embodiment, for example, by lifting the engagement protrusion without requiring the rotation of the check, the guide block and the check configuring the check mechanism may be configured so that the engagement protrusion engages with the engagement groove of the guide block or the engagement protrusion is removed from the engagement groove.

In the embodiment, for example, as long as the tilt operation of the movable panel 12 can be allowed, the check configuring the check mechanism may be directly connected to each edge (support bracket 31 or the like) in the width direction of the vehicle of the movable panel.

In the embodiment, the fixing cam 52 and the rotation cam 51 are disposed in the drive shoe 21 and the slide checks 41 and 72 (edges in the width direction of the vehicle of the movable panel 12). However, the disposition relationship may be mutually inverted. That is, the rotation cam may be provided in the drive shoe 21 as the first engagement member, and the fixing cam may be provided in the slide checks 41 and 72 as the second engagement member.

In the embodiment, the rotation check 46 and the engagement and disengagement switch mechanism 50 (rotation cam 51 and fixing cam 52) are coaxially disposed with each other. However, the axis lines of the rotation check 46 and the engagement and disengagement switch mechanism 50 may be different from each other as long as the rotation check 46 and the engagement and disengagement switch mechanism 50 extend in the front-rear direction.

In the embodiment, when the movable panel 12 is operated from the open state to the closed state, the drive shoe 21 presses the pressed portion 46b of the rotation check 46 in the regulation portion 26a. However, as long as there is no functional trouble, the drive shoe 21 may press an appropriate position of the movable panel 12 side in the appropriate portion.

In the embodiment, as the tilt-up state of the movable panel 12, two steps are adopted, which include the first tilt-up state, and the second tilt-up state which is tilted up further than the first tilt-up state. Meanwhile, the initial tilt-up state to which the movable panel 12 is transferred from the fully closed state may be coincident with the tilt-up state when the movable panel 12 slides.

In the embodiment, the aspect of the linkage between the drive shoe 21 and the support brackets 31 and 71 (movable panel 12) is an example. For example, a guide groove having a direction opposite to the guide groove 22a may be formed in the support brackets 31 and 71 (vertical wall portion 32), and the lifting guide pin which is movably fitted to the guide groove may be fixed to the drive shoe 21.

Next, technical ideas understood from the embodiment and other examples will be described below.

An aspect of this disclosure is directed to a sunroof device for a vehicle including a guide rail which is provided on each edge in a width direction of a vehicle of an opening formed on a vehicle roof; a first sliding member which is linked with each edge in the width direction of the vehicle of a movable panel opening and closing the opening, is driven so as to move along the guide rail by an electric drive source driven and controlled by a controller, is moved toward the front side of the vehicle with respect to the movable panel in a fully closed state of the movable panel, lifts the rear portion of the movable panel with the front portion thereof as a support point, and transfers the movable panel to a tilt-up state, in which in the tilt-up state, the first sliding member engages with the movable panel when the first sliding member moves toward the rear side of the vehicle after the first sliding member further moves toward the front side of the vehicle with respect to the movable panel to maintain the tilt-up state; a guide block in which an engagement groove is formed and which is provided on the guide rail; a check which includes an engagement protrusion capable of engaging with the engagement groove, is connected to each edge in the width direction of the vehicle of the movable panel, regulates the movement of the movable panel when the engagement protrusion engages with the engagement groove in the fully closed state and the first sliding member moves toward the front side of the vehicle, and releases the regulation of the movement of the movable panel so that the engagement protrusion is deviated from the engagement groove when the first sliding member moves toward the rear side of the vehicle after the first sliding member further moves toward the front side of the vehicle; and a regulation wall which prevents deformation of the guide block when the first sliding member moves toward the rear side of the vehicle with respect to the movable panel in the fully closed state.

According to this configuration, since the engagement protrusion of the check engages with the engagement groove of the guide block in the fully closed state and the movement of the movable panel is regulated, when the first sliding member moves toward the rear side of the vehicle, the electric drive source is overloaded according to the regulation of the movement of the first sliding member. The controller detects the position (initial position) of the first sliding member in the fully closed state based on the overload state of the electric drive source, and stores (initializes) the position. In this case, since the deformation of the guide block is prevented by the regulation wall, it is possible to decrease possibility of detecting the initial position of the first sliding member in an unstable state or the like, and it is possible to further improve accuracy when the initialization is performed.

It is preferable that the sunroof device for a vehicle according to the aspect of this disclosure further includes a support member which is provided in each edge in the width direction of the vehicle of the moveable panel and supports the movable panel in which the first sliding member is linked with each edge in the width direction of the vehicle of the movable panel via the support member, and in which the regulation wall is provided in the support member.

According to this configuration, since the regulation wall is provided in the support member, it is possible to decrease an increase of the number of parts.

It is preferable that the sunroof device for a vehicle according to the aspect of this disclosure, further includes a second sliding member which is movable along the guide rail integrally with the movable panel in a state where a tilt operation of the movable panel is allowed; a first engagement member which is provided in the first sliding member; and a second engagement member which is provided in the second sliding member, and is separated from the first engagement member when the first sliding member moves toward the front side of the vehicle to transfer the movable panel from the fully closed state to the tilt-up state, in which the first engagement member and the second engagement member engage with each other when the first sliding member moves toward the rear side of the vehicle after the first sliding member further moves toward the front side of the vehicle with respect to the movable panel in the tilt-up state, and the first sliding member is configured so that the tilt-up state is maintained, and in which the regulation wall is provided in the second sliding member.

According to this configuration, since the regulation wall is provided in the second sliding member, it is possible to decrease an increase of the number of parts.

In the sunroof device for a vehicle according to the aspect of this disclosure, it is preferable that the regulation wall abuts or approaches an upper end surface in a height direction of the vehicle of the guide block penetrating a notch formed on the guide rail in the height direction of the vehicle to prevent deformation of the guide block.

According to this configuration, since the regulation wall may be positioned above the guide block in the height direction of the vehicle, it is possible to decrease possibility of interfering with a peripheral component.

In the sunroof device for a vehicle according to the aspect of this disclosure, it is preferable that the support member includes a metal vertical wall portion which is vertically provided on each edge in the width direction of the vehicle of the movable panel and includes the through-hole penetrating in the width direction of the vehicle, and the resin molded portion which buries the vertical wall portion to fill the through hole, and the regulation wall is provided in the molded portion.

According to this configuration, since the regulation wall is formed of a resin, it is possible to further improve formability. Meanwhile, since the regulation wall (molded portion) buries the vertical wall portion to fill the through hole, it is possible to more tightly integrate the vertical wall portion.

According to the aspect of this disclosure, it is possible further to improve accuracy when initialization is performed.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A sunroof device for a vehicle, comprising:
a guide rail which is configured to be provided on each edge in a width direction of a vehicle of an opening formed on a vehicle roof;
a first sliding member which is configured to be linked with each edge in the width direction of the vehicle of a movable panel opening and closing the opening, is driven so as to move along the guide rail by an electric drive source driven and controlled by a controller, is moved toward the front side of the vehicle with respect to the movable panel in a fully closed state of the movable panel, lifts the rear portion of the movable panel with the front portion thereof as a support point, and transfers the movable panel to a tilt-up state, in which in the tilt-up state, the first sliding member engages with the movable panel when the first sliding member moves toward the rear side of the vehicle after the first sliding member further moves toward the front side of the vehicle with respect to the movable panel to maintain the tilt-up state;
a guide block in which an engagement groove is formed and which is provided on the guide rail;
a check which includes an engagement protrusion capable of engaging with the engagement groove, is connected to each edge in the width direction of the vehicle of the movable panel, regulates the movement of the movable panel when the engagement protrusion engages with the engagement groove in the fully closed state and the first sliding member moves toward the front side of the vehicle, and releases the regulation of the movement of the movable panel so that the engagement protrusion is deviated from the engagement groove when the first sliding member moves toward the rear side of the vehicle after the first sliding member further moves toward the front side of the vehicle; and a regulation wall which prevents deformation of the guide block when the first sliding member moves toward the rear side of the vehicle with respect to the movable panel in the fully closed state.

2. The sunroof device for a vehicle according to claim 1, further comprising:

a support member which is configured to be provided in each edge in the width direction of the vehicle of the moveable panel and supports the movable panel, wherein the first sliding member is linked with each edge in the width direction of the vehicle of the movable panel via the support member, and wherein the regulation wall is provided in the support member.

3. The sunroof device for a vehicle according to claim 1, further comprising:

a second sliding member which is movable along the guide rail integrally with the movable panel in a state where a tilt operation of the movable panel is allowed;

a first engagement member which is provided in the first sliding member; and a second engagement member which is provided in the second sliding member, and is separated from the first engagement member when the first sliding member moves toward the front side of the vehicle to transfer the movable panel from the fully closed state to the tilt-up state, wherein the first engagement member and the second engagement member engage with each other when the first sliding member moves toward the rear side of the vehicle after the first sliding member further moves toward the front side of the vehicle with respect to the movable panel in the tilt-up state, and the first sliding member is configured so that the tilt-up state is maintained, and wherein the regulation wall is provided in the second sliding member.

4. The sunroof device for a vehicle according to claim 1, wherein the regulation wall abuts or approaches an upper end surface in a height direction of the vehicle of the guide block penetrating a notch formed on the guide rail in the height direction of the vehicle to prevent deformation of the guide block.

5. The sunroof device for a vehicle according to claim 2, wherein the regulation wall abuts or approaches an upper end surface in a height direction of the vehicle of the guide block penetrating a notch formed on the guide rail in the height direction of the vehicle to prevent deformation of the guide block.

6. The sunroof device for a vehicle according to claim 3, wherein the regulation wall abuts or approaches an upper end surface in a height direction of the vehicle of the guide block penetrating a notch formed on the guide rail in the height direction of the vehicle to prevent deformation of the guide block.

7. The sunroof device for a vehicle according to claim 2, wherein the support member includes a metal vertical wall portion which is vertically provided on each edge in the width direction of the vehicle of the movable panel and includes a through-hole penetrating in the width direction of the vehicle. and a resin molded portion which buries the vertical wall portion to fill the through hole, and wherein the regulation wall is provided in the molded portion.

* * * * *